Jan. 16, 1968  G. F. MORRIS  3,364,486
ELECTRONIC NAVIGATION SYSTEM
Original Filed Nov. 9, 1962  2 Sheets-Sheet 1

INVENTOR.
GEORGE F. MORRIS
BY
Martin LuKacher
ATTORNEY

United States Patent Office 3,364,486
Patented Jan. 16, 1968

3,364,486
ELECTRONIC NAVIGATION SYSTEM
George F. Morris, Rochester, N.Y., assignor to General Dynamics Corporation, a corporation of Delaware
Original application Nov. 9, 1962, Ser. No. 236,661, now Patent No. 3,206,754, dated Sept. 14, 1965. Divided and this application Dec. 4, 1964, Ser. No. 415,946
5 Claims. (Cl. 343—119)

ABSTRACT OF THE DISCLOSURE

An azimuth tracking system useful in Tacan navigation systems is described. A pair of directional antennas are mounted on a common pedestal for receiving patterns which are angularly displaced with respect to each other. The pedestal is rotated by a servo system so that the direction of the source will be along a line bisecting the angle between the antennas. This direction can be displayed on a dial operated by the servo system. Information for operating the servo system is obtained by synchronously applying the signals received by each antenna to the servo system in accordance with Tacan pulses which are received by each antenna.

---

The present invention relates to electronic navigation systems and particularly to a system for deriving information as to the relative bearing of cooperating craft. This application is a division of my application, Ser. No. 236,-661, filed Nov. 9, 1962, now Patent No. 3,206,754, issued Sept. 14, 1965.

This invention is especially suitable for use in direction finders employed for tracking targets or point-source signals. In prior signal systems of this type, antennas, usually of the dish type, are adapted to radiate and/or receive two slightly angularly displaced signal lobes so that when the two lobes are rapidly switched, the antenna can be servoed to a position where the signal source lies on a line bisecting the angle of displacement of the two lobes. A mechanical relay is used to switch either one or the other of the antennas to the receiver input. The relay is driven such that the antennas are continuously switched to the receiver input at some predetermined rate. This system is particularly disadvantageous in tracking or determining the direction of craft which transmit signals at relatively low rate, such as is the case in Tacan navigation system equipped craft. Received pulses may be lost during the switching period and a large amount of filtering and smoothing of the signal may be required in order to operate the receiver.

An object of this invention is to provide an improved direction finding system for tracking targets, particularly cooperating aircraft, in which the foregoing difficulties and disadvantages are substantially eliminated.

A further object of the invention is to provide an improved system of the Tacan type which is operative to provide azimuthal information respecting cooperating craft.

Briefly described, a system embodying the invention includes an antenna having a pattern including a pair of angularly displaced lobes. An electronic switch is connected to the antennas and to a receiver input for alternately connecting the output from different ones of the lobes to the receiver. Means are provided for driving the switch in synchronism with incoming pulses which are received by the antenna so that each antenna lobe receives the same number of pulses. A servo system responsive to the output received on each antenna lobe is operative to position the antenna so that the signals received on each lobe have equal amplitudes. The antenna therefore tracks the transmitting source and the position of the antenna indicates the bearing of the transmitting source.

Other objects and features of this invention will become apparent to those skilled in the art by referring to the specific embodiment described in the following specification and illustrated in the accompanying drawings in which.

Figure 1:
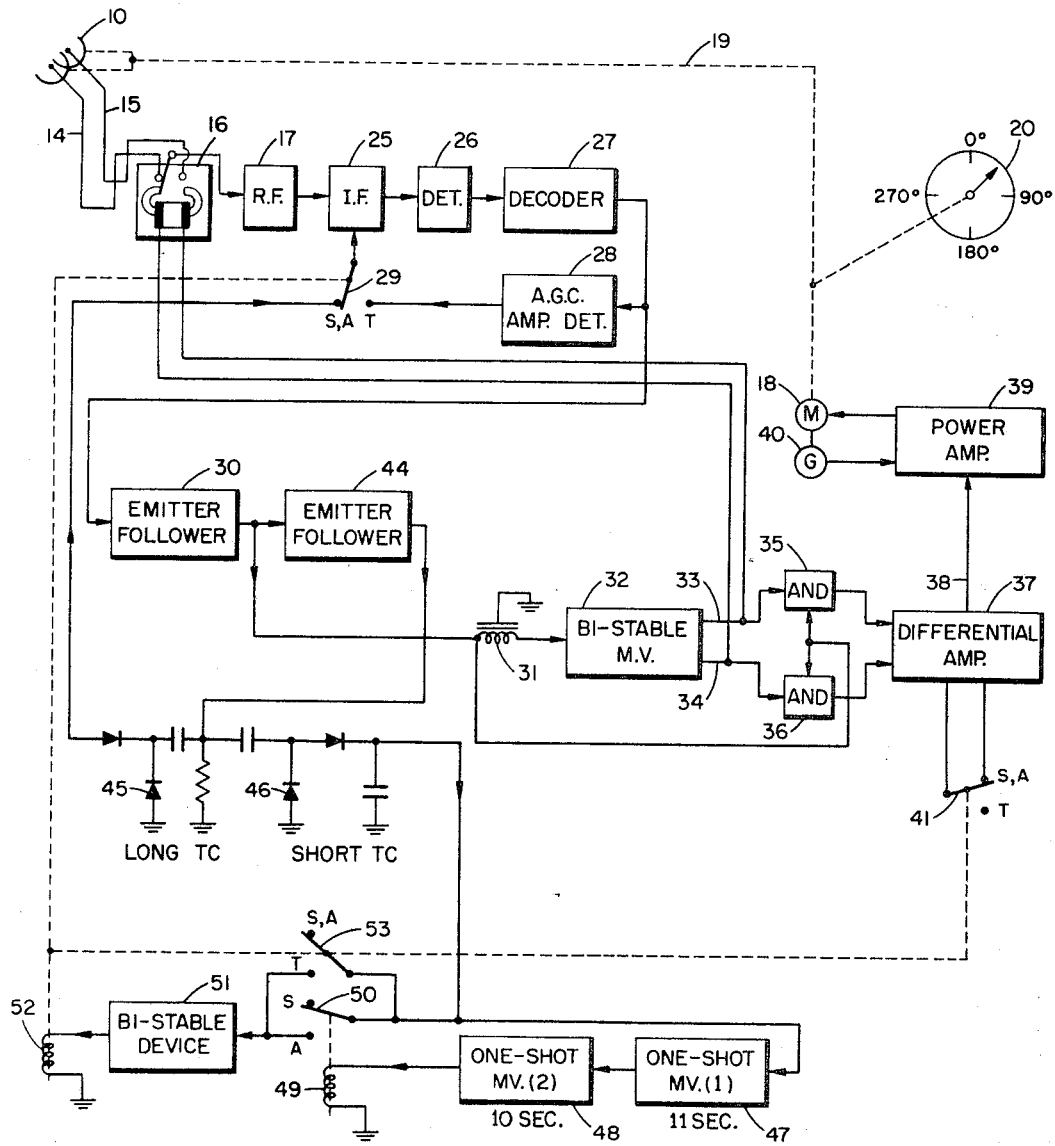
FIG. 1 is a block diagram of a system employing the signal seeking features of this invention, the particular system shown being for navigation purposes.
Figure 2:
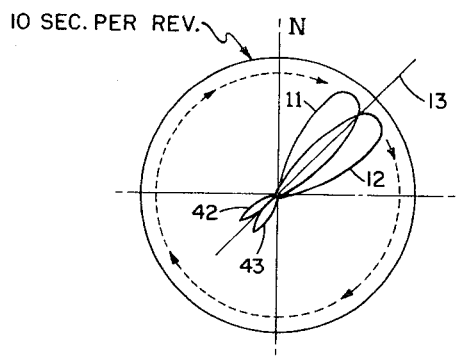
FIG. 2 is a polar diagram of the rotating directional antenna and its forward and backward lobes employed in the system of FIG. 1.

The specific embodiment illustrated in FIG. 1 comprises a radio navigation receiver of the type which may be used in Tacan, and which is adapted to employ the maximum signal seeking features of this invention. The directional antenna 10 comprises any reflector structure with at least two probes suitably disposed in the reflector to produce two slightly diverging beams or signal pattern lobes. The lobes are customarily of the shape shown at 11 and 12 of the polar diagram of FIG. 2. Any signal source or target lying on line 13 will produce signals of equal amplitude on the two feedlines 14 and 15. When the signals on lines 14 and 15 are rapidly switched by solid state switching mechanism 16 (shown diagrammatically as a relay which may be of the polarized type) into the RF amplifier 17, a signal can be obtained of the proper amplitude and polarity to drive motor 18 in either direction. Motor 18 is mechanically connected to the directional antenna through reduction gears and mechanical link 19 to continuously rotate the antenna during search, or to reversibly move the antenna in either direction to follow or "track" the received signal after lock-on. The azimuthal position of the antenna is preferably indicated on dial 20, which shows 360° of the compass and has a pointer mechanically or electrically linked to the antenna drive mechanism. The receiving system for driving the motor in FIG. 1 includes the RF amplifier 17 with a first detector, the IF amplifier 25, the detector 26, and in the case of a Tacan receiver, the decoder 27. Detector 26 generates a series of pulses, the characteristics of which are acceptable to the decoder. The gain of the receiving system is normally controlled by the automatic gain control amplifier and detector 28 which integrates the decoder output to produce a direct current biasing voltage which is proportional to the average amplitude of the received signal and which is fed back to the IF and/or RF amplifiers of the receiver in the usual manner to control the sensitivity of the amplifier as the received signal level increases or fades. The direct current bias, in the example of FIG. 1, is applied to the intermediate frequency amplifier portions of the receiver through switch 29. In the normal tracking mode, the switch is closed on contact T, and during the search and acquisition mode, described below, the switch is closed on contacts S, A.

The output of the decoder is also current amplified, as by the emitter-follower 30. After a slight delay in delay line 31, the received decoded pulses drive the bistable multivibrator 32 so that the output lines 33 and 34 of the multivibrator are alternately energized at the frequency of the decoded pulses. The output signals of lines 33 and 34 are applied, respectively, to one input each of the early-late AND gates 35 and 36. The other inputs of the AND gates 35 and 36 are connected in parallel and directly to the output of the current amplifier emitter-follower 30. The outputs of the early-late AND gates 35 and 36 are compared in the differential amplifier 37 to produce at the output 38 of the amplifier a zero voltage when the two signals from the two lobes 11 and 12 are equal, and a plus or minus voltage when the signals are unbalanced. The error signal at 38 is amplified in power amplifier 39 sufficiently to drive reversible motor 18 in either direction. To reduce hunting and stabilize the servo system, the tachometer generator 40 senses the rate or speed of motor 18 to control the gain of the power amplifier 39. By means of switch 41, the differential amplifier can be unbalanced so as to continuously drive motor 18 in one direction. Unbalance is effected when the switch is closed on contacts S, A. During search and acquisition of a signal, contacts S, A of switch 41 are closed, and during tracking the contacts are opened to the tracking contact T. By mechanisms which will be described, switches 29 and 41 normally rest on contacts S, A during search and acquisition and are shifted to "track" contacts T when a suitable signal is received.

The directional antenna 10 invariably has two or more back lobes, as shown at 42 and 43, and is capable of receiving a strong signal from the rear. Such a signal will be received, amplified and decoded, and can operate the tracking mechanisms and cause the antenna to falsely "track" a signal received from the rear. According to this invention, the antenna is driven without interruption through one complete revolution so that all forward and backward signals are scanned. The sensitivity of the receiver circuits are adjusted by the maximum signal received during the first scan. Then, a second scan is started; and since only the maximum signal is of sufficient strength to register a receiver output, the receiver output during the second scan can be employed to arrest scanning action when that signal is received.

In the embodiment shown in FIG. 1, the decoded signals are preferably current amplified in emitter-follower 44. The output of emitter-follower 44 is coupled to detectors 45 and 46, which are coupled, respectively, in long and short time constant networks. By long time constant is meant a circuit which will hold a voltage substantially undiminished for a period during two revolutions of the antenna. The short time constant is short enough to decay immediately after receipt of signals from the follower 44. The first signal received by the receiver is applied through the short time constant circuit to the one-shot multivibrator 47. The duration of the unstable state of the one-shot multivibrator is equal to or slightly greater than one scanning period or one revolution of the antenna. When the one-shot multivibrator 47 returns to its stable state, the second one-shot multivibrator 48 is triggered and the coil 49 is energized. Energization closes switch 50 which, in turn, operates the bistable device 51, such as a Schmitt trigger circuit, to energize coil 52. Coil 52 operates the contacts of switches 29, 41 and 53. Device 51 triggers in one direction when the input potential is raised to a critical value, and triggers in the reverse direction when the input is reduced to another value.

To start operation, all contacts are returned to S, A position and power is applied to the motor to start rotation of the antenna. When the first signal is received, the sensitivity of the receiver is at a maximum and the first signal, even of minimum amplitude, is received, amplified and decoded. This first signal operates one-shot multivibrator 47 and the motor continues through one complete scanning cycle. Thereupon, the second one-shot multivibrator 48 is operated for a second period of time equal to the scanning period, and relays 49 and 52 are energized. As the scanning continues, the signal of maximum amplitude is encountered, is decoded, and establishes maximum bias voltage across the long time constant circuit 45. During the second scan, the weaker signals are excluded by the gain control bias and only the signal of maximum amplitude is passed and decoded. Accordingly, during the second scan, only the strong signal is received and is applied through contacts 50 to the trigger device 51 and to the coil of relay 52 to hold it. Since relay 52 is energized, all connected contacts are moved to "track." This means that the differential amplifier is now permitted to function normally and to stop the motor when the strongest signal has been received the second time. Contacts 29 are closed to permit normal automatic gain control voltages to be fed back to the IF amplifier 25 and the now acquired strong signal continues to hold relay 52 and contacts 53 in the T position.

Figure 3:
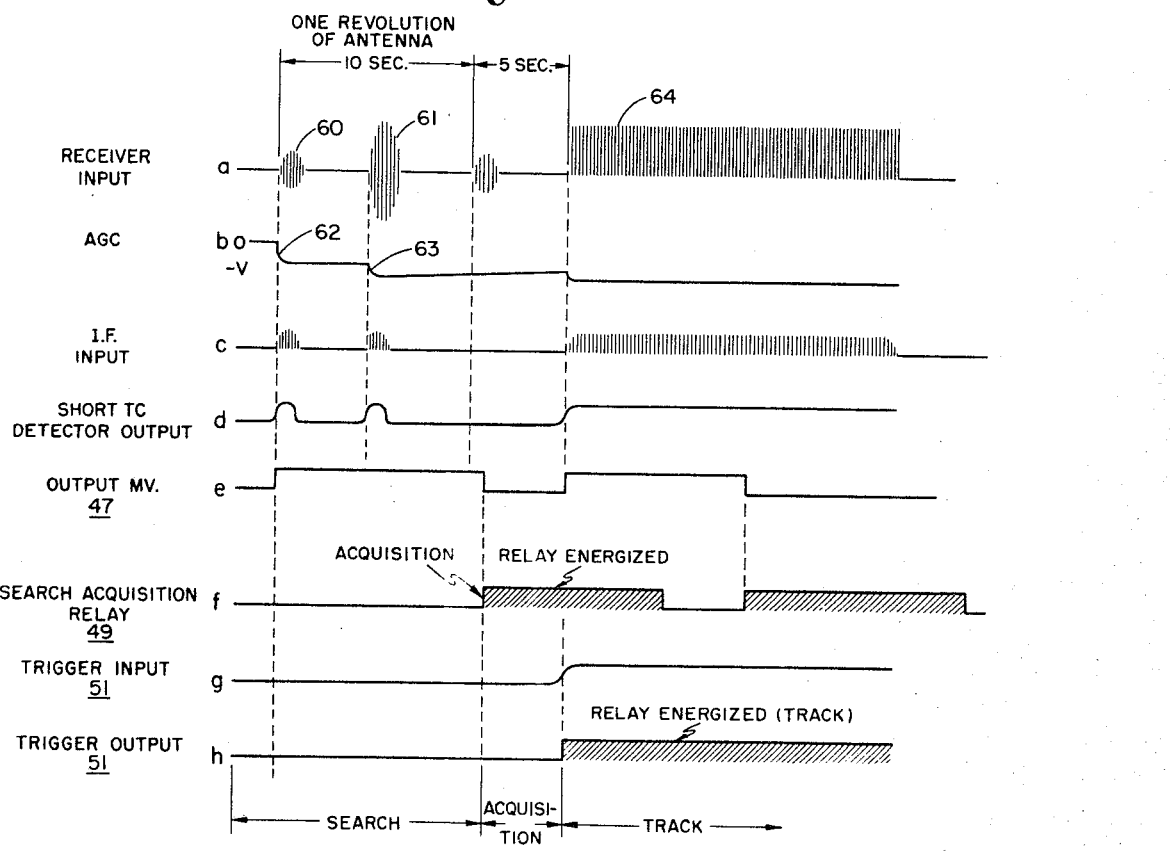
FIG. 3 is a set of voltages at the principal points in the system of FIG. 1.

The sequence of operation may be read directly from the set of voltage waveforms of FIG. 3. On line $a$ is shown the signal envelope at the receiver input, and it is assumed that, first, a weak signal 60 is received. If it is assumed that the antenna revolves in ten seconds, the strong or forward signal 61 is received five seconds later. Each signal 60 and 61 is decoded and establishes an automatic gain control voltage at 45, FIG. 1, which changes in steps, as shown at 62 and 63, line $b$. The maximum AGC bias voltage is established by the maximum signal. The output of the IF amplifier is shown on line $c$. During the second scan, the weak signal 60 is again received, but is not passed through the now highly biased IF amplifier. The steady signal 64, of line $a$, indicates signal 61 has been received during the second scan and that search by the motor driven antenna has ceased and that tracking has commenced. It will be noticed that the pulse train picked up by the back lobe on the second revolution of the antenna is completely eliminated by the AGC voltage generated by the main lobe. Line $d$ is the output of the short time constant detector. This direct current voltage follows closely the envelope of the output of the IF amplifier. On line $e$, the output of the one-shot multivibrator 47 shows that this multivibrator is triggered by the positive-going edge of the short time constant detector output. Multivibrator 48 is triggered by the negative-going edge of multivibrator 47, and on line $f$ is shown the output of the multivibrator, the current of which may be the same as the current through the search-acquisition relay 49. The input of trigger circuit 51, shown on line $g$, is energized by 46 through contacts 50 only after the maximum signal has been received the second time. The output of trigger 51, and the current through relay 52, is shown on line $h$. Only when the contacts 41 of the search-track relay 52 is in the "track" position can the differential amplifier function and the antenna drive respond to error signals and servo the antenna for normal tracking.

It is now apparent that the system shown in FIG. 1 will scan all signals throughout one scanning cycle to establish minimum sensitivity of the receiver, and that, thereafter, in the second cycle, only the signal of maximum amplitude is received and tracking permitted. Many modifications may be made in the components of this invention without departing from the scope of the invention as defined in the appended claims.

What is claimed is:
1. A system for indicating the direction from a signal receiving point to a signal transmitting point comprising
    (a) means at said receiving point for detecting from two angularly displaced directions signal pulses from said transmitting point which arrive at said receiving point,
    (b) receiving means for comparing successive signals with each other and deriving an indication of the relative strength of said successive signal pulses, and
    (c) means operated synchronously by and with signal pulses from said detecting means for alternately applying to said receiving means signals which arrive from different ones of said two directions so that equal numbers of said signal pulses are detected from each of said angularly displaced directions by said detecting means.
2. A system for indicating the direction from a signal receiving point to a signal transmitting point comprising
    (a) means at said receiving point for detecting from two angularly displaced directions signal pulses from said transmitting point which arrive at said receiving point,

(b) receiving means for comparing successive signal pulses with each other and deriving an output signal indicative of the relative strength of said successive signal pulses, (c) means operated synchronously by and with said signal pulses from said detecting means for alternately applying to said receiving means signal pulses which arrive from different ones of said directions so that equal numbers of said signal pulses are detected from each of said angularly displaced directions by said detecting means, (d) means for positioning said detecting means in response to said receiving means output signal until said detecting mean signals have the same relative strength whereby a line bisecting the angle defined by intersecting lines disposed in said two directions indicates the direction of said transmitting point.

3. A system for locating a radio signal transmitting point comprising (a) a rotatable antenna having a receiving pattern including a pair of lobes which are angularly displaced from each other, (b) a switch connected to said antenna for selectively providing signal pulses from different ones of said lobes, (c) receiver means connected to said switch for providing output signal pulses in response to signals provided by said antenna, (d) means for operating said switch in synchronism with said output signal pulses from said receiving means for alternately providing signal pulses from different ones of said lobes to said receiver means so that said lobes each receive equal numbers of transmitted signal pulses, and (e) means for positioning said antenna so as to reduce the difference between alternate ones of said receiver means output signal pulses, whereby a line bisecting the angle of displacement of said lobes indicates the location of said transmitting point.

4. A signal for locating a pulse signal transmitting source comprising (a) a rotatable antenna having a receiving pattern including a pair of lobes which are angularly displaced from each other, (b) a switch connected to said antenna for selectively providing a signal pulse from different ones of said lobes, (c) a receiver having an input connected to said switch for providing an output pulse in response to each transmitted pulse which is received at its input, (d) means operated by said output pulses from said receiver for operating said switch in synchronism therewith so that said lobes each receive equal numbers of transmitted signal pulses, and (e) means for rotating said antenna in a sense and by an amount for reducing the difference between alternate ones of said received output pulses whereby the position of said antenna is indicative of said transmitting source.

5. A system for detecting a target which transmits pulse signals comprising (a) a pair of directional antennas having receiving patterns each including a lobe which is angularly displaced from the lobe of the other, (b) signal receiving means for deriving pulses in response to said transmitted pulse signals, (c) a bistable device operated by said derived pulses to automatically assume different ones of its stable states in response to successive ones of said derived pulses, (d) switching means operated by said bistable device for coupling different ones of said pair of antennas to the input of said receiving means when said bistable device is in different ones of its stable states so that said lobes each receive an equal number of said transmitted pulse signals, (e) a pair of AND gates coupled to said bistable device and automatically enabled thereby, said gates being connected to said receiving means for passing said derived pulses when enabled, and (f) a servo system operated in accordance with the sense and magnitude of the amplitude difference between the pulses passed by different ones of said AND gates for positioning said antenna to track said target.

References Cited
UNITED STATES PATENTS 2,929,058  3/1960  Blasberg et al. _____ 343—16

RODNEY D. BENNETT, *Primary Examiner.*

CHESTER L. JUSTUS, *Examiner.*

D. C. KAUFMAN, *Assistant Examiner.*